United States Patent Office 2,912,452
Patented Nov. 10, 1959

2,912,452

THIOPHOSPHORIC ACID ESTERS AND THEIR PRODUCTION

Gerhard Schrader, Wuppertal-Cronenberg, and Hanshelmut Schlör, Wuppertal-Barmen, Germany, assignors to Farbenfabriken Bayer Aktiengesellschaft, Leverkusen, Germany, a corporation of Germany No Drawing. Application April 12, 1957
Serial No. 652,366

Claims priority, application Germany April 21, 1956

3 Claims. (Cl. 260—461)

This invention relates to thiophosphoric acid esters of the general formula:

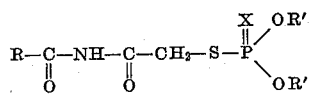

in which R stands for alkyl and aryl radicals which both may furthermore be substituted by other groups such as halogen groups, nitro groups, alkoxy groups and the like, R' stands for lower alkyl radicals, especially such ones having from 1–4 carbon atoms, and X stands for oxygen or sulphur.

Thiophosphoric acid esters have become more and more important in the field of insecticides, acaricides, miticides etc. during the last years. Thus, it is the principal object of the present invention to provide a new class of phosphoric acid esters, suitable as pesticides or as intermediates for the production of these phosphoric acid esters; still further objects will become apparent as the following description proceeds.

In accordance with this invention it has now been found that a very effective class of pesticides or plant-protecting agents consists of substances of the above mentioned formula. These esters may be prepared by reacting O.O-dialkyl thio- or dithiophosphates with the corresponding acylated compounds of chloroacetamide, as this may be seen from the following equation:

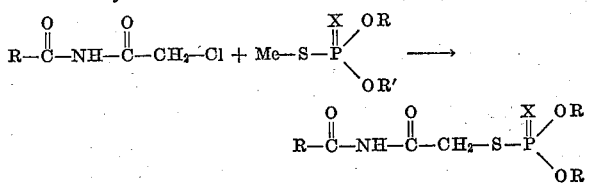

In these formulae R, R' and X have the same significance as described above, Me stands for a salt-forming radical such as sodium, potassium, ammonium and the like.

As special acyl radicals "R'—CO—" there may be mentioned the residues of acetic acid, propionic acid, butyric acid, isobutyric acid, valeric acetic acid, phenylacetic acid and the like. Special aromatic acid radicals are for instance those of benzoic acid, o,m,p-chlorobenzoic acids, the nitrobenzoic acids, the toluic acids and the like. It has to be understood, however, that these examples are given only by way of illustrating without limiting this invention thereto. Also polycyclic acid radicals such as from naphthoic acids or radicals from heterocyclic acids such as pyridinic or quinolinic acids are within the scope of the present invention.

The reaction of the appropriate acylated chloroacetamides with the salts of O.O-dialkyl thio- or dithiophosphoric acids generally may be carried out in suitable inert solvents such as water, lower alcohol, ketones and the like. The reaction temperatures should be preferably between about room temperature and 60–80° C.

The new phosphoric acid esters exhibit remarkable insecticidal properties against e.g. aphids, flies, mites, lice etc. Generally they may be applied in concentrations from about 0.001% to about 1%, diluted with suitable solid carriers such as talc, chalk, bentonite, clay or liquid carriers, such as water, organic solvents etc. Aerosols may also be utilized in the generally known manner, the preferred method of application is to dust or spray such compositions on suitable objects or on plants.

To show a special example for the utility of the inventive compounds the following one of the formula

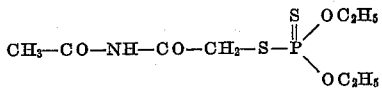

has been dissolved in the same amount of acetone and then diluted to a 0.01% aqueous solution (in the presence of a small amount of a commercial emulsifier such as a polyglycol ether of benzyl-hydroxydiphenyl having about 15 glycol radicals in its chain). These solutions kill black bean aphids, spider mites and ovae of spider mites completely. The toxicity of the above shown compound has been determined on rats orally as 250 mg. per kilogram $LD_{95}$.

The following examples may illustrate this invention without, however, restricting it thereto.

*Example 1*

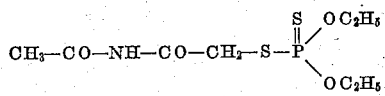

56 grams of acetochloroacetamide (Fp. 105° C.; 0.41 mol) are dissolved in 200 ml. aqueous ethanol (50%). To this solution there is added dropwise an aqueous solution containing 0.41 mol O.O-diethyldithio-phosphate of sodium. While stirring this reaction mixture is heated to about 60° C. within one hour and this reaction temperature is kept for a further hour before it is cooled down. 50 ml. benzene are added and the benzene layer is separated, washed with water and dried over anhydrous sodium sulfate. The benzene then is distilled off and there are obtained 83 grams of the above shown new ester as yellowish water-insoluble oil.

If instead of sodium-O.O-diethyl-dithiophosphate the corresponding molecular amount of the O.O-dipropyl- or O.O-dibutyl-ester is used there are obtained the esters of the formulae

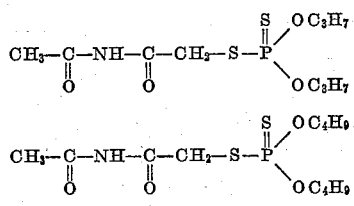

*Example 2*

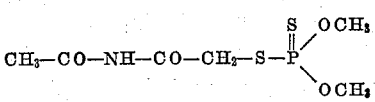

68 grams of acetochloroacetamide are dissolved in 250 ml. of aqueous ethanol (50%). At 50° C. there is added dropwise an aqueous solution of the sodium salt of O.O-dimethyl dithiophosphoric acid. The reaction mixture is heated to 60° C. and then worked up as described in the foregoing example. There are obtained 64 grams of the new ester, that is 50% of the theory.

This ester has a remarkable low toxicity of about 1 gram per kilogram determined on rats orally. 0.01% aqueous solutions kill black bean aphids completely. Also this compound exhibits a remarkable innertherapeutical activity.

By the same method may be obtained the following esters:

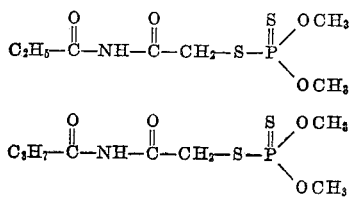

if instead of acetochloroacetamide the corresponding molecular amount of the appropriate propiono- and butyro-chloroacetamides are used.

*Example 3*

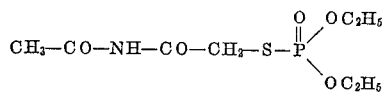

27 grams of acetochloroacetamide (0.2 mol) are dissolved in 200 ml. 50% aqueous ethanol. An aqueous solution (200 ml.) of 38 grams of the ammonium salt of O.O-diethyl thiolphosphoric acid are added while keeping the temperature at about 60° C. This temperature is kept for one further hour, the reaction mixture then is allowed to cool down, diluted with ice-water and the precipitated oil is taken up in ether. The ethereal solution is washed with water and dried over anhydrous sodium sulfate. After distilling off the solvent there are obtained 45 grams of the new ester as water-insoluble oil. This ester shows a toxicity of $LD_{50}$ of 50 mg. per kilogram on rats orally. 0.01% aqueous solutions kill black bean aphids completely. 0.1% aqueous solutions have an ovizide activity with spider mites. Furthermore, solutions of this compound exhibit innertherapeutical activity.

By the same method there may be obtained the following esters:

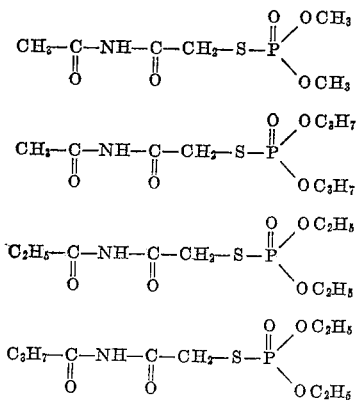

when the corresponding molecular amounts of the corresponding necessary other starting materials are used.

*Example 4*

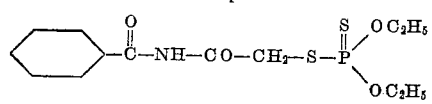

A concentrated aqueous solution containing 0.25 mol of a sodium salt of O.O-diethyl dithiophosphoric acid is poured into 300 ml. acetone. This solution is heated to 50° C. and then treated slowly with 49 grams (0.25 mol) of chloroacetyl benzamide. The solution is heated to gently boiling (about 60° C.), then diluted with ice-water and separated from the precipitated oil. The separated aqueous solution is shaken with ether two times and this ethereal extract is combined with the oily layer. The combined extracts are dried over anhydrous sodium sulfate and the ether then is distilled off. The product slowly solidifies and may be recrystallized from acetyl acetate. There are obtained 70 grams melting at 79° C., that is 80% of the theory. This compound tested on rats orally exhibits a $LD_{50}$ of 250 mg. per kilogram. 0.1% aqueous solutions show systemic action against black bean aphids.

*Example 5*

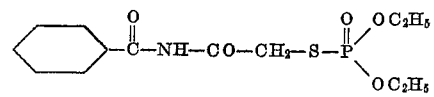

57 grams (0.3 mol) ammonium salt of O.O-diethyl thiolphosphoric acid are dissolved in 400 ml. acetone and at 50° C. there are added 59 grams (0.3 mol) chloroacetylbenzamide. The reaction mixture is heated for three hours under reflux (60° C.), then is cooled down and diluted with ice-water. The following procedure may be carried out as described in the foregoing example. The above shown endproduct recrystallises from acetylacetate/petrol ether and melts then at 56–58° C. The yield amounts to 51 grams, that is 51% of the theory. The $LD_{50}$ on rats orally has been determined to 100 mg. per kilogram. 0.1% aqueous solutions kill spider mites and black bean aphids completely and show also innertherapeutical activity.

*Example 6*

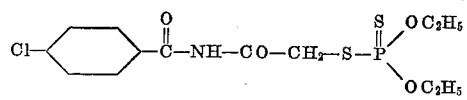

A concentrated aqueous solution containing 0.2 mol of a sodium salt of O.O-diethyl dithiophosphoric acid is treated with 46 grams (0.2 mol) of chloroacetyl-p-chlorobenzamide at 50° C. as described in the foregoing example. The working-up-procedure is exactly the same as described in the foregoing example. After recrystallising this compound from benzene/petrol ether there are obtained 72 grams, that is 95% of the theory of the above shown substance melting at 127–128° C.

*Example 7*

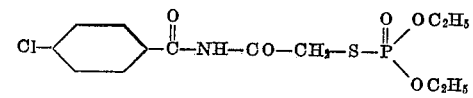

38 grams (0.2 mol) of the ammonium salt of O.O-diethyl thiolphosphoric acid are dissolved in 300 ml. acetone. At a temperature of about 45° C. there are added slowly 46 grams (0.2 mol) chloroacetyl-p-chlorobenzamide. The temperature is kept for three further hours at 60° C. and the reaction mixture is worked up as described above. There are obtained 55 grams of the above shown ester, that is 75% of the theory melting at 72–75° C. after having been crystallised from benzene/petrol ether. Also this compound exhibits innertherapeutical activity. 0.1% aqueous solutions kill black bean aphids effectively. The $LD_{50}$ on rats orally has been determined to 50 mg. per kilogram.

We claim:
1. A thiophosphoric acid ester of the formula

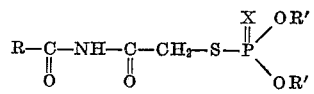

in which R stands for a member selected from the group consisting of lower alkyl, phenyl and chlorphenyl radicals, R' stands for a lower alkyl radical and X stands for a member selected from the group consisting of oxygen and sulphur.

2. A thiophosphoric acid ester of the following formula:
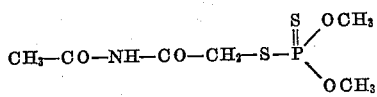
3. A thiophosphoric acid ester of the following formula:
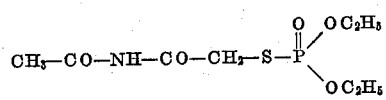
References Cited in the file of this patent
UNITED STATES PATENTS
| | | |
|---|---|---|
| 2,494,126 | Hoegberg | Jan. 10, 1950 |
| 2,494,283 | Cassaday et al. | Jan. 10, 1950 |
| 2,566,129 | Hook et al. | Aug. 21, 1951 |
FOREIGN PATENTS
| | | |
|---|---|---|
| 257,649 | Switzerland | May 2, 1949 |